US012584058B2

(12) United States Patent
Sarmiento Klapper

(10) Patent No.: US 12,584,058 B2
(45) Date of Patent: Mar. 24, 2026

(54) DRILLING FLUID WITH SELF-ADJUSTED ALKALINITY

(71) Applicant: Baker Hughes Oilfield Operations LLC, Houston, TX (US)

(72) Inventor: Helmuth Sarmiento Klapper, Hannover (DE)

(73) Assignee: Baker Hughes Oilfied Operations LLC, Houston, TX (US)

( * ) Notice: Subject to any disclaimer, the term of this patent is extended or adjusted under 35 U.S.C. 154(b) by 5 days.

(21) Appl. No.: 18/213,737

(22) Filed: Jun. 23, 2023

(65) Prior Publication Data

US 2023/0416586 A1 Dec. 28, 2023

Related U.S. Application Data

(60) Provisional application No. 63/355,018, filed on Jun. 23, 2022.

(51) Int. Cl.
*C09K 8/03* (2006.01)
*C09K 109/00* (2006.01)

(52) U.S. Cl.
CPC .......... *C09K 8/032* (2013.01); *C09K 2109/00* (2013.01)

(58) Field of Classification Search
CPC . C09K 8/03; C09K 8/032; C09K 8/04; C09K 8/05; C09K 2109/00
See application file for complete search history.

(56) References Cited

U.S. PATENT DOCUMENTS

| | | | |
|---|---|---|---|
| 7,151,077 B2 | 12/2006 | Prud et al. | |
| 9,260,648 B2 * | 2/2016 | Suryawanshi | ........... C09K 8/40 |
| 10,047,268 B2 | 8/2018 | Karale et al. | |
| 2003/0236171 A1 * | 12/2003 | Nguyen | ................... C09K 8/08 |
| | | | 507/100 |

| | | | |
|---|---|---|---|
| 2010/0056401 A1 * | 3/2010 | Samuel | ................. C09K 8/512 |
| | | | 507/219 |
| 2013/0065798 A1 | 3/2013 | Amanullah et al. | |
| 2021/0079289 A1 | 3/2021 | Reyes et al. | |

FOREIGN PATENT DOCUMENTS

| | | | | |
|---|---|---|---|---|
| CA | 2807827 A1 * | 6/2013 | ............. | C08L 1/284 |
| CN | 103509536 A | 1/2014 | | |
| CN | 108384525 A * | 8/2018 | ............... | C09K 8/24 |
| CN | 109135689 A * | 1/2019 | | |
| CN | 113337256 A * | 9/2021 | | |
| CN | 114058350 A * | 2/2022 | ............. | E21B 37/06 |
| WO | 2014165249 A1 | 10/2014 | | |

OTHER PUBLICATIONS

Translation of CN-108384525-A (Year: 2018).*
Translation of CN-109135689-A (Year: 2019).*
Translation of CN-113337256-A (Year: 2021).*
Translation of CN-114058350-A (Year: 2022).*
Engler, Christoper Tom, et al., "Understanding and Addressing the Challenges of Assessing the Corrosion Fatigue of Metallic Materials for Drilling Applications", Nace International Corrosion Conference Expo, Paper No. 8918, 2017.
International Search Report and Written Opinion issued in connection with corresponding PCT Application No. PCT/US2023/026154, dated Oct. 20, 2023.
European Search Report dated Sep. 15, 2025, for European Patent Application No. 23827914.5.
Office Action dated Jul. 14, 2025 for Saudi Arabian Application No. 1120247332.

* cited by examiner

*Primary Examiner* — Angela M DiTrani Leff

(74) *Attorney, Agent, or Firm* — Baker Hughes Company

(57) ABSTRACT

The aqueous phase of a drilling fluid can be provided with self-adjusting alkalinity by introducing a buffering system, where the buffering system includes a buffering agent, an acid or a base, and an inorganic salt, and where the pH of the aqueous phase is in the range of from about 8 to about 12. In one non-limiting embodiment, the pH does not vary by more than about 0.5 pH units after a variation in temperature of the drilling fluid of at least about 175° C. for at least about 200 hours.

12 Claims, No Drawings

DRILLING FLUID WITH SELF-ADJUSTED ALKALINITY

CROSS-REFERENCE TO RELATED APPLICATIONS

This application claims the benefit of U.S. Provisional Patent Application Ser. No. 63/355,018, filed Jun. 23, 2022, entitled "Drilling Fluid with Self-Adjusted Alkalinity," the disclosure of which is hereby incorporated herein by reference in its entirety.

TECHNICAL FIELD

The present invention relates to drilling fluid compositions; and more particularly relates to drilling fluid compositions and methods for making them, where the drilling fluids include an aqueous phase having self-adjusting alkalinity.

TECHNICAL BACKGROUND

Drilling fluids are typically classified according to their base fluid. In water-based muds, solid particles are suspended in water or brine. Oil can be emulsified in the water. Nonetheless, the water is the continuous phase. Oil-based muds are the opposite or inverse. Solid particles are suspended in oil, and water or brine is emulsified in the oil, and the oil is the continuous phase. Brine-based drilling fluids, of course are a water-based mud in which the aqueous component is brine. It is apparent to those selecting or using a drilling fluid for oil and/or gas exploration that an essential component of a selected fluid is that it be properly balanced to achieve the necessary characteristics for the specific end application. Because drilling fluids are called upon to perform a number of tasks simultaneously, this desirable balance is not always easy to achieve.

It is desirable to use water-based fluids (WBFs) because they often have fewer environmental concerns and are generally less expensive. However, with the continued increase in drilling operations with demanding service conditions, mainly characterized by high temperatures, high pressures (HTHP), and extreme corrosive environments containing large halide concentrations and the presence of dissolved corrosive gases like carbon dioxide ($CO_2$) and hydrogen sulfide ($H_2S$), the chemical stability of drilling fluids is becoming essential. Stability in this case means relatively consistent pH over time and in an extended range of operational temperatures. Several failure analyses of technical equipment have shown pH excursions from the desired range as the root cause for downhole failures or significant damage to assets leading to costly non-productive time (NPT) and repair or even scrap costs. Pitting corrosion, environmental assisted cracking, cobalt-leaching, elastomers damage, secondary corrosion—all of these downhole corrosion mechanisms strongly depend on pH.

The pH-value of WBFs is typically measured by the mud engineer at the rig. Based on this result, and if necessary, alkaline additives such as lime (calcium oxide (CaO) and/or calcium hydroxide ($Ca(OH)_2$), sodium hydroxide (NaOH), among others are added to maintain the pH of the mud system between 8 and 11. The buffer capacity of the drilling fluid fully depends, therefore, on the mud engineer and the pH-monitoring strategy. This standard procedure is based on two assumptions: (1) the pH of the drilling fluid does not change with temperature (which can be especially challenging in high temperature wells); and (2) there is no time delay between measuring the pH of the mud and introducing additives to alter or control the pH of the mud. From a practical perspective, a time delay is unavoidable. If these assumptions are not fulfilled, a significant operative risk is introduced into the stability of the drilling fluid.

It would be desirable if drilling fluids and methods for using them could be improved by increasing the pH-stability of the aqueous phase of a drilling fluid used in subterranean exploration and production.

SUMMARY OF THE INVENTION

There is provided in one non-restrictive version, a method for modifying a drilling fluid to have self-adjusted alkalinity, where the method includes introducing a buffering system into the aqueous phase of the drilling fluid, where the buffering system includes at least one buffering agent, at least one acid or a base, and optionally at least one inorganic salt, where the pH of the aqueous phase is in the range of from about 8 to about 12.

There is additionally provided in another non-limiting embodiment a drilling fluid having self-adjusted alkalinity, where the drilling fluid includes a buffering system that includes at least one buffering agent, at least one acid or a base, and optionally at least one inorganic salt, where the pH of the aqueous phase is in the range of from about 8 to about 12.

In other embodiments, the present disclosure is directed to a method for modifying a drilling fluid to have self-adjusted alkalinity, where the drilling fluid has an aqueous phase. The method includes the steps of producing a buffering system by providing a buffering agent, providing a pH-modifying agent, and combining the buffering agent with a pH-modifying agent. The method continues with the step of combining the buffering system with the aqueous phase of the drilling fluid.

In another embodiment, the present disclosure is directed at a buffering system for use in providing self-adjusted alkalinity to a drilling fluid. The buffering system includes a buffering agent and a pH-modifying agent, where the pH-modifying agent is an acid or a base.

In yet other embodiments, the present disclosure is directed to a drilling fluid that includes a buffering system and an aqueous phase having a pH range of between about 8 and 12. The buffering system includes a buffering agent and a pH-modifying agent. The buffering system combines with the aqueous phase to stabilize the pH of the aqueous phase.

DETAILED DESCRIPTION

It has been discovered that introducing a buffer system into the water-based drilling fluids (WBFs) and the water phase of oil-based fluids (OBFs) to avoid or mitigate undesired pH-excursions minimizes the impact of corrosion on downhole equipment, and simultaneously reduces the cost of additives for establishing the alkalinity in these fluids. It is desired that drilling fluids have high buffered pH to help with fluids stability, improve polymer hydration, neutralize acid gasses such as $CO_2$ and $H_2S$, and treat cement contaminations while maintaining optimum rheological properties. Additionally, certain additives such as aluminum complexes and silicates used for clay inhibition need high pH environment to remain soluble in the fluid. A drop in pH below 10 can precipitate these additives causing them to not perform as desired. It is expected that the buffering systems described herein will have applicability in a broad variety of drilling fluid types and will also be applicable in completion fluids, which generally do not have a hydrocarbon phase, nor do they contain solids. Where the drilling fluid further includes a hydrocarbon phase in addition to the aqueous phase, the drilling fluid can be an emulsion.

In short, the use of a self-adjustable, buffered alkaline drilling fluid provides continuous, effective, and timely pH control because the buffered alkaline drilling fluid includes optimized quantities of the additives in the formulation that confer the pH-stability and buffer capacity of the fluid regardless of temperature and chemical changes. The use of pH-stabilized drilling fluids provides several benefits, including stabilization for HTHP applications, improved reliability of downhole equipment and assets, extended service life and operational limits of the engineering materials, reduced quantity of conventional additives and reduced drilling and operational costs, and a decreased requirement for fluid monitoring at the rig during operation.

More specifically, drilling fluids can be provided with self-adjusting alkalinity by introducing a buffering system into an aqueous phase of a drilling fluid. These drilling fluids are alkaline, that is, they have a pH ranging from about 8 independently to about 11, alternatively from about 9 independently to about 12. As used herein with respect to a range, the term "independently" means that any threshold may be used together with any other threshold to give a suitable alternative range. For instance, in this case a pH ranging from about 8 to about 12 would be suitable.

As noted, a goal is to make the pH of the drilling fluid stable, that is, fluctuations in the drilling fluid pH are reduced or mitigated. While it is an acceptable and worthy goal to provide a completely pH-stable drilling fluid with no pH excursions or fluctuations, the method and compositions described herein are considered successful if the drilling fluid is more pH stable with the buffering system as compared with an otherwise identical drilling fluid without the buffering system. In one non-limiting embodiment, the pH measured at room temperature of the aqueous phase containing the buffering system does not vary by more than about 0.5 pH units after many hours at an elevated temperature. In a non-limiting example, the pH returns to within about 0.5 pH units of the beginning pH after at least about 200 hours of the introduction of the buffering system at a temperature of at least about 150° C.; alternatively at a temperature of at least about 175° C. Without necessarily being restricted to a particular definition, this is one meaning of "self-adjusted alkalinity."

In another non-limiting embodiment, the at least one buffering agent is present in the aqueous phase in a concentration of between about 0.0125 M (mol/liter) independently to about 0.15 M; alternatively, from between about 0.04 M independently to about 0.12 M; in another non-limiting embodiment up to about 0.5 M. Theoretically, the concentration of each of the buffering agent and the acid or base in the aqueous phase could be from 1 ppm to near saturation. "Near saturation" is defined herein to be up to 99.5% saturation, alternatively up to 99% saturation, in one non-limiting embodiment up to 98% saturation, in a different non-restrictive version up to 95% saturation, and in a different, alternative version up to 90% saturation. The chemical compositions in Table III are only examples and should not limit the scope of the application. In one non-limiting embodiment, the drilling fluid includes a buffering agent and one acid or a base in a measurable concentration until saturation can be used. In another non-restrictive version, the at least one acid or a base is present in the aqueous phase between about 0.0005 M independently to about 0.05 M; alternatively, from between about 0.002 M independently to about 0.01 M; in another non-limiting embodiment up to about 0.5 M. The at least one inorganic salt is present in the aqueous phase between about 1 ppm independently to about 5.0 M; alternatively, from between about 0.01 M independently to about 0.1 M.

In further non-restrictive embodiments, suitable buffering agents include potassium di-hydrogen phosphate ($KH_2PO_4$), sodium tetraborate ($NaB_4O_7 \cdot 10H_2O$), N-cyclohexyl-2-aminoethanesulfonic acid, sodium bicarbonate ($NaHCO_3$), potassium bicarbonate ($KHCO_3$), calcium bicarbonate ($Ca(HCO_3)_2$), magnesium bicarbonate ($Mg(HCO_3)_2$), and combinations thereof. In another non-limiting embodiment, the at least one acid may include one or more of the following: hydrochloric acid, sulfamic acid, formic acid, acetic acid and/or a carbonic acid; and the base may include one or more of sodium hydroxide (NaOH), potassium hydroxide (KOH), and calcium hydroxide ($Ca(OH)_2$). Further, the at least one inorganic salt may include sodium chloride (NaCl), potassium chloride (KCl), calcium chloride ($CaCl_2$)), magnesium chloride ($MgCl_2$), and combinations thereof. To be clear, an acid and a base would not be used together; only an acid or a base would be used. However, in non-limiting embodiments, multiple acids can be used together, or multiple bases can be used together.

It should be realized that there are a number of optional additives or components that may also be present in WBFs including, but not necessarily limited to, weighting agents, lubricants, shale stabilizers, wellbore stabilizers, emulsifiers, corrosion inhibitors, oxygen scavengers, and $H_2S$-scavengers, rate of penetration (ROP) enhancers, anti-bit balling additives, anti-accretion additives, and combinations thereof.

The invention will now be further described with respect to certain Examples which are provided to further illustrate the invention, but not to limit it in any particular way.

Example 1

Corrosion testing has confirmed that the buffer systems developed for this purpose are reliably suitable for keeping their chemical stability at temperatures up to 175° C. The results are documented in several test reports. Presented below is one example from one independent lab in Germany using a buffer system with the composition 0.05 M KCl+ 0.032 M NaOH+2.20 M NaCl.

TABLE I

| EXPERIMENTAL PARAMETERS | |
| --- | --- |
| Test Vessel | CrNiMo-alloy Autoclave |
| Medium | 3.8 L air-saturated aqueous solution, composition according to Table II, probes fully immersed |
| Temperature, ° C. | 175 |
| Gauge Pressure, bar | Approx. 8.9 (vapor pressure at 175° C.) |
| Gas Phase | Air and water vapor according to the vapor pressure of the medium at 175° C. |
| Exposure time, hr. | 209 |

TABLE II

| COMPOSITION OF THE TEST MEDIUM | | |
| --- | --- | --- |
| Component | Amount needed for 5 L solution | Concentration [mol/L] |
| NaOH | 6.393 | 0.032 |
| KCl | 18.6376 g | 0.05 |

TABLE II-continued

| COMPOSITION OF THE TEST MEDIUM | | |
|---|---|---|
| Component | Amount needed for 5 L solution | Concentration [mol/L] |
| NaCl | 642.81 | 2.20 |
| DI $H_2O$ | to fill up to 5 L | |
| Total chloride | | 2.25 |
| pH | pH: 11.90 (22.0° C.) | |

During the test, the pH changed from 11.90 at 22.0° C. before the test and returned to 11.88 at 22.0° C. after the test, following the temperature cycle in the autoclave.

As shown, after more than 209 hours at 175° C. the pH of the solution, which was adjusted with very low amounts of NaOH, KCl and NaCl, had a negligible change of 0.02 pH-units. Thus, the pH of the aqueous phase was very stable. It should be mentioned that this solution was used for running a corrosion test using metallic samples that were fully immersed in it.

Shown in Table III are a variety of buffer solutions that have been used for corrosion testing, and which fall within the compositions of the aqueous phases described herein, and which are presented here only as illustrative examples. It should be emphasized that aqueous phase compositions described herein are not limited to those described in Table III. "RT" refers to room temperature.

drilling fluids including, but are not necessarily limited to, completion fluids, drill-in fluids, workover fluids, stimulation fluids and the like. Similarly, it is expected that the methods may be successfully practiced using different loadings, compositions, acids, bases, buffering agents, inorganic salts, temperature ranges, and proportions than those described or exemplified herein.

The present invention may also suitably consist of or consist essentially of the elements disclosed. Alternatively, the compositions and methods may be practiced in the absence of an element not disclosed. For instance, there may be provided a method for modifying a drilling fluid to have self-adjusted alkalinity, where the method comprises, consists essentially of, or consists of introducing a buffering system into an aqueous phase of the drilling fluid, where the buffering system comprises, consists essentially of, or consists of at least one buffering agent, at least one acid or a base, and optionally at least one inorganic salt, where the pH of the aqueous phase is in the range of from about 8 to about 12.

In another non-limiting embodiment, there may be provided a drilling fluid having self-adjusted alkalinity, where the drilling fluid comprises, consists essentially of, or consists of a buffering system comprising, consisting essentially of, or consisting of at least one buffering agent, at least one acid or a base, and optionally at least one inorganic salt, where the pH of the aqueous phase is in the range of from about 8 to about 12.

TABLE III

| CHEMICAL COMPOSITION OF BUFFER SOLUTIONS | | | | |
|---|---|---|---|---|
| pH at RT | [Cl⁻] M | T* (° C.) | pH at T* | Chemical Composition |
| 8.3 | 2.25 | 22 ± 2 | 8 | 0.0125M $Na_2B_4O_7 \cdot 10H_2O$ + 0.0227M NaOH + 0.5M NaCl |
| 10.0-10.2 | 0.50 | | 10 | 0.0125M $Na_2B_4O_7 \cdot 10H_2O$ + 0.0227M NaOH + 0.5M NaCl |
| 9.8-10.1 | 4.00 | | 10 | 0.0125M $Na_2B_4O_7 \cdot 10H_2O$ + 0.0383M NaOH + 4M NaCl |
| 9.7-9.8 | 1.58 | 50 ± 2 | 9.5 | 0.0125M $Na_2B_4O_7 \cdot 10H_2O$ + 0.0227M NaOH + 1.579M NaCl |
| 11.8-12.1 | 2.25 | 75 ± 2 | 10 | 0.05M KCl + 0.032M NaOH + 2.20M NaCl |
| 11.7-11.8 | 5.00 | | 9.5 | 0.05M KCl + 0.032M NaOH + 4.95M NaCl |
| 8.5-8.6 | 0.5 | 88 ± 2 | 8 | 0.0125M $Na_2B_4O_7 \cdot 10H_2O$ + 0.0061M HCl + 0.4939M NaCl |
| 8.5-8.6 | 2.25 | | 8 | 0.0125M $Na_2B_4O_7 \cdot 10H_2O$ + 0.0005M NaOH + 2.25M NaCl |
| 8.8-9.0 | 4.00 | | 8 | 0.0125M $Na_2B_4O_7 \cdot 10H_2O$ + 0.016M NaOH + 4M NaCl |
| 12.3-12.6 | 2.25 | | 10 | 0.05M KCl + 0.132M NaOH + 2.25M NaCl |
| 12.5-12.9 | 0.50 | 150 ± 5 | 10 | 0.05M KCl + 0.132M NaOH + 0.45M NaCl |
| 12.1-12.5 | 4.00 | | 10 | 0.05M KCl + 0.136M NaOH + 3.95M NaCl |

In the foregoing specification, the invention has been described with reference to specific embodiments thereof and has been described as effective for modifying the aqueous phase of a drilling fluid to have self-adjusted alkalinity. However, it will be evident that various modifications and changes can be made thereto without departing from the broader scope of the invention as set forth in the appended claims. Accordingly, the specification is to be regarded in an illustrative rather than a restrictive sense. For example, specific combinations of aqueous fluids, buffering agents, bases, acids, inorganic salts, proportions, temperatures, pHs, and other components and parameters falling within the claimed elements and steps, but not specifically identified or tried in a particular method or composition, are anticipated to be within the scope of this invention. For instance, the methods and compositions described herein are also applicable to the aqueous phase of fluids other than As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A method for modifying a drilling fluid to have self-adjusted alkalinity, where the drilling fluid has an aqueous phase, the method comprising:
   producing a buffering system, wherein the step of producing the buffering system comprises the steps of:
      providing a buffering agent, wherein the buffering agent is N-cyclohexyl-2-aminoethanesulfonic acid;
      providing a pH-modifying agent; and
      combining between about 0.0125 M and about 0.04 M buffering agent with between about 0.0005 M and about 0.05 M pH-modifying agent; and
   combining the buffering system with the aqueous phase of the drilling fluid.

2. The method of claim 1, wherein the step of providing the pH-modifying agent comprises selecting the pH-modifying agent from the group consisting of hydrochloric acid, sulfamic acid, formic acid, acetic acid, carbonic acid, and combinations thereof.

3. The method of claim 2, wherein the step of producing the buffering system further comprises the step of combining an inorganic salt with the buffering agent and the pH-modifying agent, wherein the inorganic salt is selected from the group consisting of NaCl, KCl, $CaCl_2$, $MgCl_2$, and combinations thereof.

4. The method of claim 1, wherein the step of producing the buffering system further comprises combining an inorganic salt with the buffering agent and the pH-modifying agent, wherein the inorganic salt is selected from the group consisting of NaCl, KCl, $CaCl_2$, $MgCl_2$, and combinations thereof.

5. The method of claim 1, wherein the step of combining the buffering system with the aqueous phase of the drilling fluid further comprises the step of adding an amount of the buffering system to the drilling fluid that is sufficient to obtain a pH of the aqueous phase of the drilling fluid within the range from about 8 to about 12.

6. The method of claim 1, wherein the step of combining the buffering system with the aqueous phase of the drilling fluid further comprises the step of adding an amount of the buffering system to the drilling fluid that is sufficient to obtain a pH of the aqueous phase of the drilling fluid that does not vary by more than about 0.5 pH units after about 200 hours at a temperature of the drilling fluid of from about 150° C. to about 175° C.

7. A drilling fluid comprising:
   a buffering system, wherein the buffering system comprises:
      between about 0.0125 M and about 0.04 M buffering agent, wherein the buffering agent is N-cyclohexyl-2-aminoethanesulfonic acid; and
      between about 0.0005 M and about 0.05 M pH-modifying agent; and
   an aqueous phase having a pH range of between about 8 and 12; and
   wherein the buffering system combines with the aqueous phase to stabilize the pH of the aqueous phase.

8. The drilling fluid of claim 7, wherein the pH-modifying agent comprises at least one acid selected from the group consisting of hydrochloric acid, sulfamic acid, formic acid, acetic acid, and carbonic acid.

9. The drilling fluid of claim 7, wherein the pH-modifying agent comprises at least one base selected from the group consisting of sodium hydroxide (NaOH), potassium hydroxide (KOH), and calcium hydroxide ($Ca(OH)_2$).

10. The drilling fluid of claim 7 further comprising an inorganic salt, wherein the inorganic salt is present in the aqueous phase of the drilling fluid in a concentration between about 0.01 M and about 5.0 M (mol/liter).

11. The drilling fluid of claim 7, wherein the pH of the aqueous phase does not vary by more than about 0.5 pH units after a period of about 200 hours at a temperature of the drilling fluid of from about 150° C. to about 175° C.

12. A method for modifying a drilling fluid to have self-adjusted alkalinity, where the drilling fluid has an aqueous phase, the method comprising:
   producing a buffering system, wherein the step of producing the buffering system comprises the steps of:
      providing a buffering agent, wherein the buffering agent is N-cyclohexyl-2-aminoethanesulfonic acid;
      providing a pH-modifying agent; and
      combining between about 0.0125 M and about 0.04 M buffering agent with between about 0.0005 M and about 0.05 M pH-modifying agent; and
   combining the buffering system with the aqueous phase of the drilling fluid, wherein the aqueous phase has a pH range of between about 8 and 12.

* * * * *